United States Patent [19]

Battigelli et al.

[11] 4,316,865
[45] Feb. 23, 1982

[54] METHOD FOR HEAT TREATMENT OF FIBROUS MATS

[75] Inventors: Jean A. Battigelli; Francois Bouquet, both of Rantigny, France

[73] Assignee: Saint-Gobain Industries, Cedex, France

[21] Appl. No.: 40,135

[22] Filed: May 18, 1979

Related U.S. Application Data

[62] Division of Ser. No. 912,482, Jun. 6, 1978, Pat. No. 4,263,007.

[51] Int. Cl.$^3$ ............................................... B29J 5/00
[52] U.S. Cl. ................................... 264/109; 264/123; 264/345
[58] Field of Search ....................... 264/109, 123, 345

[56] References Cited

U.S. PATENT DOCUMENTS

| | | | |
|---|---|---|---|
| 2,997,096 | 8/1961 | Morrison | 264/347 |
| 3,084,448 | 4/1963 | Dungler | 34/155 |
| 3,096,161 | 7/1963 | Morrison et al. | 34/155 |
| 3,518,157 | 6/1970 | Terry et al. | 264/120 |
| 3,583,030 | 6/1971 | Terry et al. | 425/328 |
| 3,652,377 | 3/1972 | Helmick | 428/218 |
| 3,865,540 | 2/1975 | Loeffler | 432/2 |

*Primary Examiner*—James R. Hall
*Attorney, Agent, or Firm*—John T. Synnestvedt; Kenneth P. Synnestvedt

[57] ABSTRACT

A technique is disclosed for heat treatment of fibrous mats, especially mats formed of mineral fibers such as glass and carrying a heat hardenable binder material, such as a thermosetting resin. The method disclosed provides for continuous feed of the mat through a curing or treating oven having a plurality of heat treatment zones. In one form of the method, the heat treatment in at least one zone is effected by circulation of a heated gas, such as air, through the mat in said zone, and the mat is also subjected to heat treatment in a localized area lying within said zone by passage of a second heated gas through the mat, the second heated gas having a pressure higher than that in the surrounding portions of said zone.

8 Claims, 6 Drawing Figures

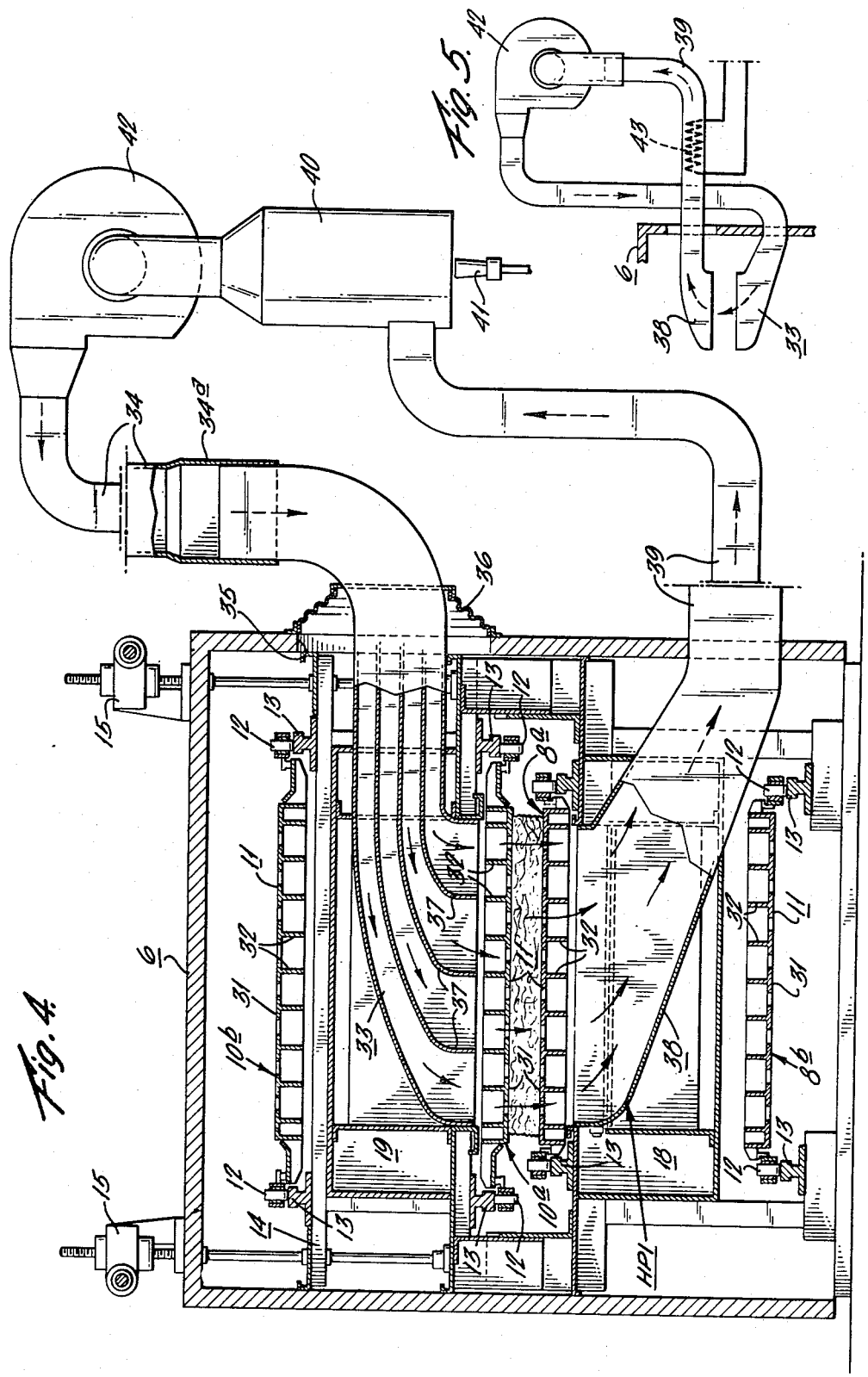

METHOD FOR HEAT TREATMENT OF FIBROUS MATS

BACKGROUND AND STATEMENT OF OBJECTS

This application is a division of our application Ser. No. 912,482, filed June 6, 1978 now U.S. Pat. No. 4,263,007, Apr. 21, 1981.

In the production of fibrous insulating mats, especially mats formed of glass or similar mineral fibers, it is customary to initially form the mat by depositing the fibers on a perforated moving conveyor, usually with the aid of suction boxes provided under the flight of the conveyor on which the fibers are deposited. It is also customary to deposit a fiber binder on the fibers either before or during the buildup of the mat on the conveyor, such binder having adhesive characteristics and usually comprising a heat curable or hardenable material, such as a thermosetting resin, for instance, a phenol formaldehyde resin sprayed on the fibers in a solution or a suspension in a volatile liquid, such as water.

The layer or blanket of relatively loose fibers on the collecting conveyor is thereafter customarily delivered to what is commonly referred to as a mat curing oven through which the mat is fed by additional perforated conveyor means, frequently comprising a pair of endless conveyors having adjacent flights presented toward each other in spaced relation and serving to determine the thickness of the mat to be formed. Such a mat may be more or less dense, depending upon the extent of compression applied by the pair of conveyors in the mat curing oven.

During passage of the mat through the oven, the mat is subjected to heat treatment to effect curing of the fiber binder and thereby to effect stabilization of the mat at the desired thickness.

For the purpose of effecting the curing of the binder, various techniques have been employed; but quite commonly, the technique includes passage of heated air through the mat, for which purpose circulation boxes or manifolds are arranged in pairs at opposite sides of the feed path of the mat through the curing oven, such ovens quite commonly including several such pairs of circulation boxes, with provision for establishing different temperature conditions sequentially through the series of pairs, so as to regulate the curing temperature applied at different zones in the path of the mat through the curing oven.

It is a principal object of the present invention to provide not only for the heating to effect curing of the binder by the primary heating system in the general manner heretofore contemplated, but in addition, the invention contemplates employment of a second independent heating system comprising at least one pair of manifolds of relatively small size operating in relatively small localized areas at opposite sides of the path of the mat, this pair of manifolds serving to pass through the mat a heated gas having a pressure and temperature sufficiently high to raise the temperature of the core portion of the mat to a higher value than that attained in the core portion in the areas surrounding said localized areas. Moreover, the heated gas of this "secondary" binder curing system is preferably passed through the mat in a localized area located in the mid or downstream portion of the feed path so that the surface layers of the mat have already been cured and stabilized by the primary heating system. This initial stabilization of the surface layers of the mat makes possible the use of relatively high pressure in the secondary heating system without disrupting the fibers of the mat.

Although the method of the invention is adaptable to the curing of a wide variety of mats and fibrous blankets, for reasons noted just above, the invention is especially advantageous in the curing of binder in relatively dense mats, because the pressure and temperature conditions employed in the secondary heating system of the present invention promote rapid penetration of the heat into the interior of even quite dense and thick fibrous products; and since the secondary high pressure air is applied after the surface layers of the mat have been stabilized, this rapid penetration is accomplished without disruption of the fibers.

In a typical installation in which the primary heat curing system involves the use of pairs of hot air circulation boxes arranged in sequence along the feed path through the oven, the method of the invention contemplates, as a secondary heat curing system, the introduction of at least one pair of hot air circulation manifolds having relatively small localized areas lying within the zone or area of one of the pairs of boxes of the primary system. In this installation, the method of the invention contemplates that the heated air of the secondary system operating in the localized area have a pressure higher than that of the air employed in the primary system. When employed in this configuration, the primary air circulation system serves not only to supply heat needed for the curing of the binder, but in addition, it serves also as a means for preventing escape or loss into the atmosphere of air leaking from the secondary system which operates at higher pressure.

By the employment of both primary and secondary systems, and by the employment of a higher pressure in the secondary system, the rapid penetration of the heat into the interior of the mat being cured in the localized area of the secondary manifolds, is highly effective in expediting attainment of the binder curing temperature in the interior or core portion of the mat; and it is an object of the invention to provide for rapid attainment of a binder curing temperature sufficiently high to initiate exothermic reaction of the binder resin. The attainment of such an exothermic temperature will result in continuance of the binder curing, even if succeeding zones of the curing oven are not maintained at the same elevated temperature. Therefore, in the overall curing operation, the use of the secondary high pressure system in the localized downstream curing areas effects an overall economy of the total fuel expended to accomplish the curing.

As disclosed and claimed in our application above identified, provision is made for novel structural arrangements for introducing the high pressure manifolds of the secondary system in the localized areas of the circulation boxes of the primary system, these structural arrangements providing for minimization of shortcircuiting and leakage and also providing automatically for yielding of some of the shielding elements without breakage thereof, in the event of buildup of resin or other deposits on the conveyors serving to carry the mat through the curing oven.

BRIEF DESCRIPTION OF DRAWINGS

How the foregoing and other objects and advantages are attained will appear more fully from the following description referring to the accompanying drawings, in which FIGS. 1a and 1b, taken together, illustrate a longitudinal sectional view through a mat curing oven used according to the present invention embodying a sequence of six pairs of hot air circulation boxes providing the primary system for the heat treatment or curing, and further a secondary system embodying two pairs of localized high pressure manifolds, one pair being disposed in each of the last two of the primary or low pressure circulation boxes;

FIG. 2 is a transverse sectional view on an enlarged scale taken through one of the pairs of primary hot air circulation boxes, as indicated by the section line 2—2 applied to FIG. 1a;

FIG. 4 is a view on the same scale as FIGS. 2 and 3 but illustrating a transverse section through a pair of secondary or high pressure circulation manifolds, this view being taken as indicated by the section line 4—4 on FIG. 1b; and FIG. 5 is a fragmentary view on a smaller scale than FIG. 4 but illustrating a modification of the high pressure air circulation system.

DETAILED DESCRIPTION OF THE DRAWINGS

Figure 1:
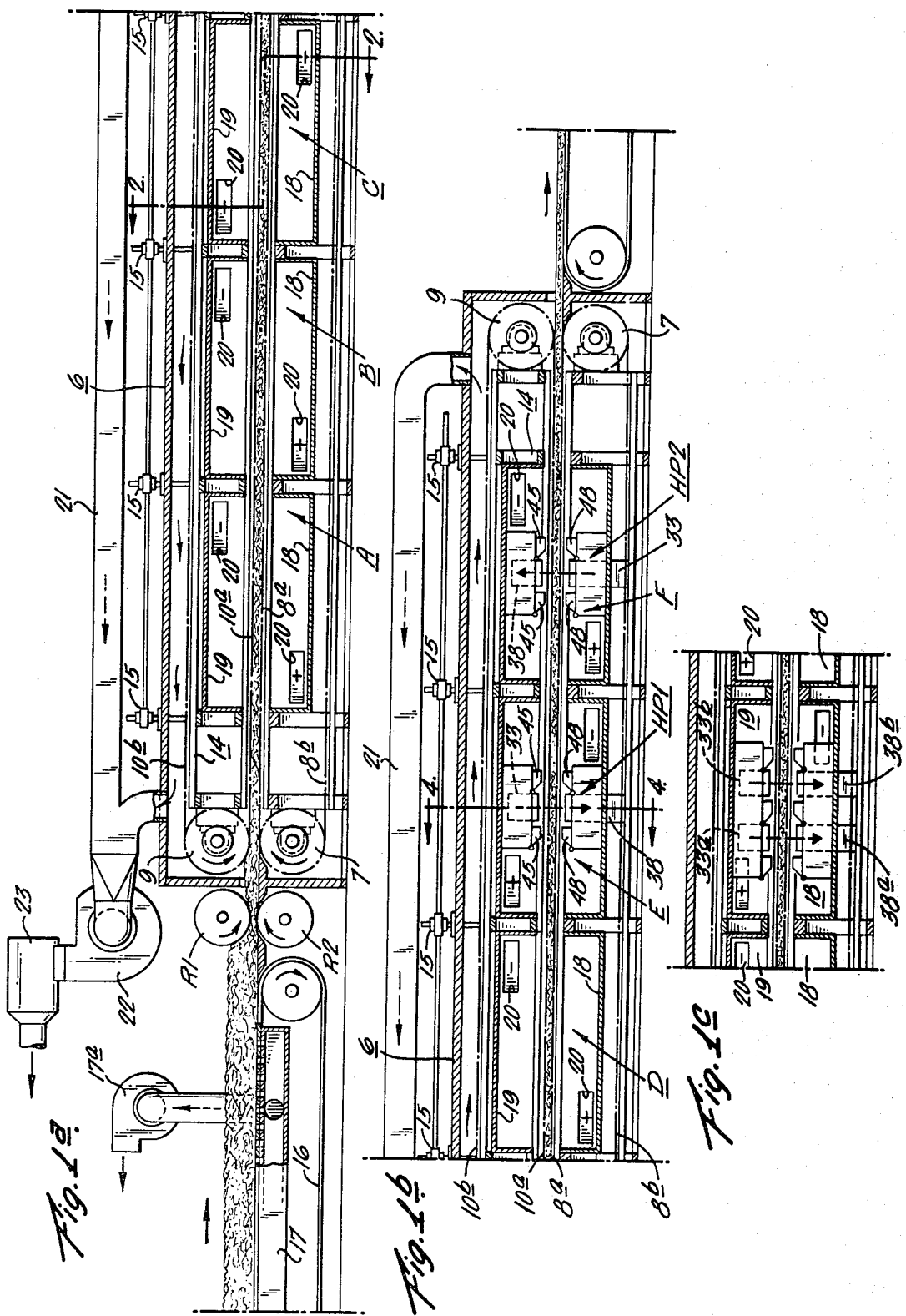
FIG. 1c is a fragmentary view similar to a portion of FIG. 1b but illustrating an alternative embodiment in which two pairs of high pressure or secondary circulation boxes are enclosed in one of the pairs of the low pressure circulation boxes.

In the drawings, the reference numeral 6 indicates the mat curing oven in general, the oven having enclosing structures or walls within which the conveyor equipment and the hot air circulation systems are arranged.

Figure 2:
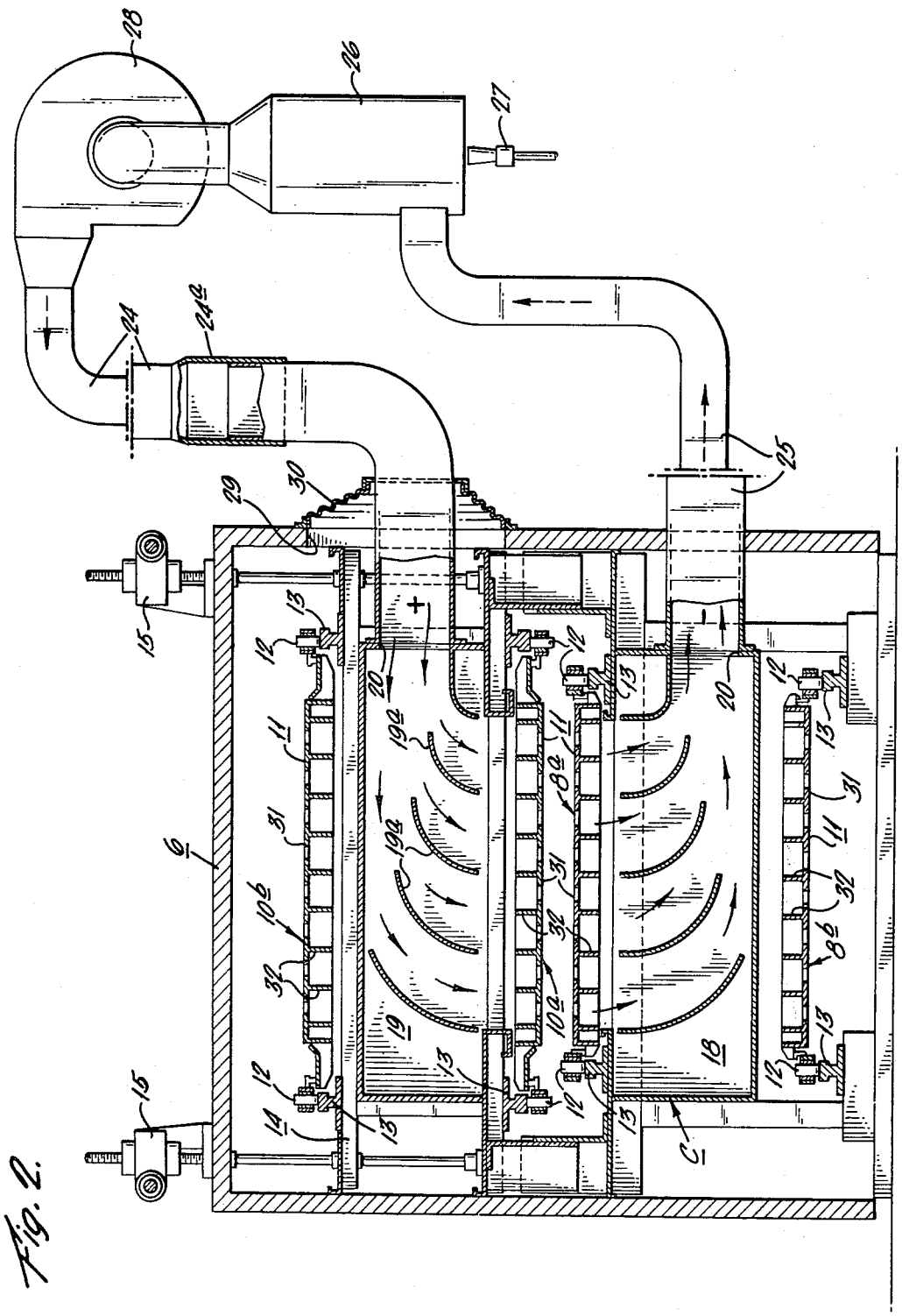
Figure 3:
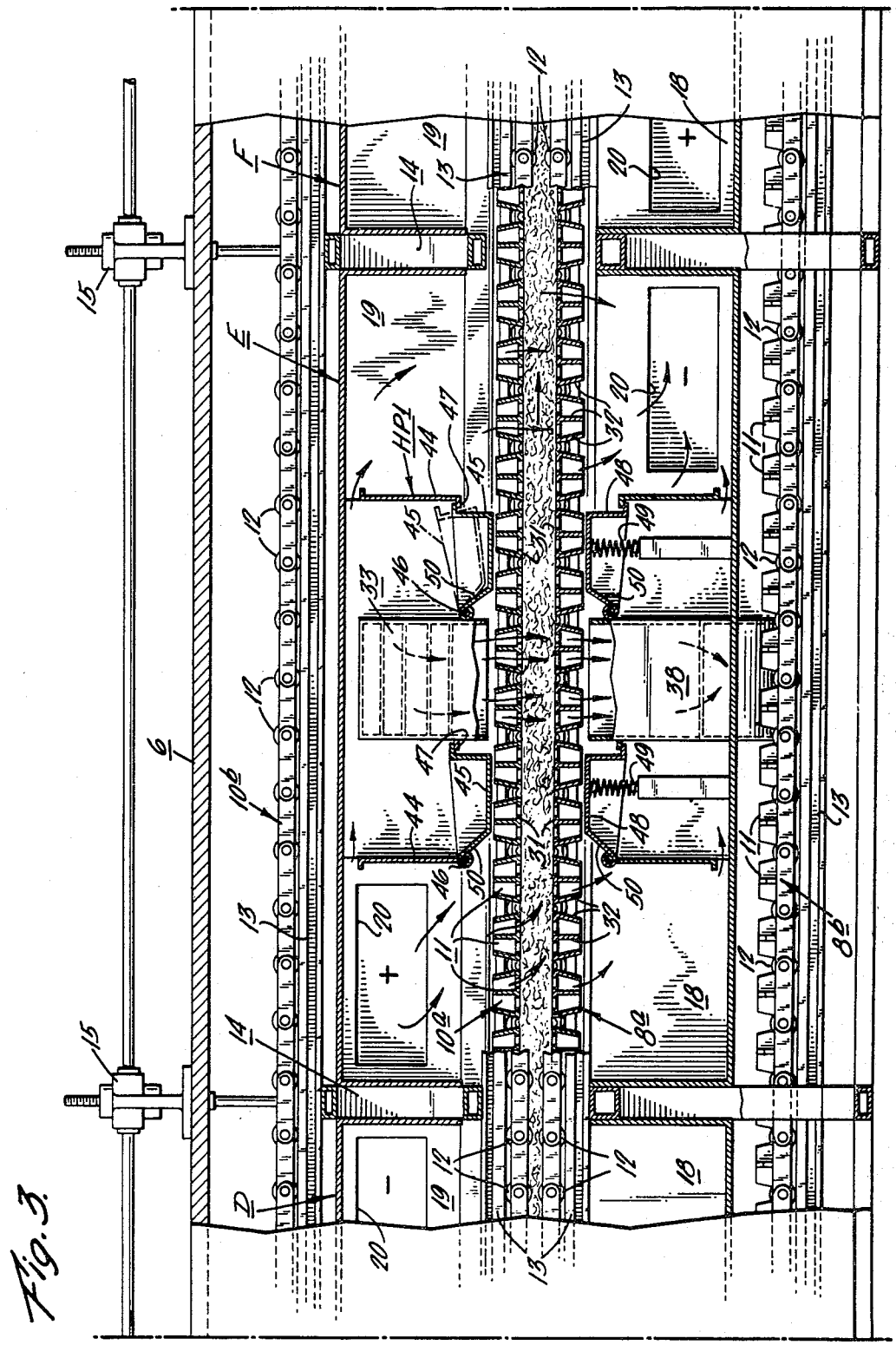
FIG. 3 is a fragmentary longitudinal sectional view on the scale of FIG. 2, illustrating one of the pairs of primary or low pressure circulation boxes having a pair of secondary or high pressure manifolds disposed therein.

As seen in FIGS. 1a and 1b, in the lower portion of the oven, rotative supporting elements or rollers 7—7 are provided for mounting the lower endless conveyor, the upper and lower flights of which are indicated in FIGS. 1a and 1b only by dot-dash lines, these conveyor flights appearing in greater detail at 8a and 8b in FIGS. 2, 3 and 4. As seen in FIGS. 1a and 1b, rotative supports or rollers 9—9 are also provided for the upper conveyor, which is indicated in FIGS. 1a and 1b only by dot-dash lines; but the lower and upper flights of which appear in greater detail at 10a and 10b in FIGS. 2, 3 and 4. Each of the conveyors is made up of a multiplicity of links which are pivotally interconnected and which carry rollers 12 adapted to ride on the tracks indicated at 13. The links are generally indicated at 11. Conveyors of this type are driven through the mounting rollers.

The rollers 9 and also the tracks 13 for the upper conveyor are mounted upon a frame structure 14 made up of longitudinal and transverse members interconnected so as to provide for adjustable positioning of the upper conveyor with respect to the lower conveyor. This adjustment may be effected by screw jacks indicated at 15 in a manner well understood in this art and forming no part of the present invention per se.

By virtue of the adjustability of the upper conveyor, the space between the conveyor flights 8a and 10a, which are the runs presented toward the fibrous mat, may be altered in order to establish the desired density or thickness of the product being made.

At the upstream or input end of the oven, a conveyor, indicated diagrammatically at 16, is provided, the conveyor here illustrated representing a perforated conveyor such as commonly employed for the collection of fibers to form a mat or blanket. Suction boxes, such as shown at 17, may be employed for assisting the collection of the fibers and for maintaining them in position on the conveyor. Suction fans 17a are connected with the suction boxes. The fibrous blanket carried by this conveyor 16 is delivered to the sizing rolls R1-R2, which are preferably adjustable in order to regulate the thickness of the mat being introduced into the oven; and after delivery of the partially sized mat from the rolls R1-R2, the mat enters between the conveyor flights in the curing oven.

Interiorly of the oven, the primary or low pressure air circulation boxes are provided in pairs. In the embodiment illustrated in FIGS. 1a and 1b, six such low pressure pairs of boxes appear, the zones or regions of these pairs being generally indicated by the letters A, B, C, D, E and F. These pairs of boxes are generally rectangular and are identified by reference numerals 18 and 19. The boxes are closed on all sides except for the side presented toward the conveyor flights 8a or 10a. Each box 18 is mounted on fixed structure below the upper flight 8a of the lower conveyor; and each box 19 is mounted on the vertically adjustable framing 14 for the upper conveyor, so that the upper boxes move with the upper conveyor when its position is adjusted.

Each box is also provided with an opening communicating with a duct for either supply or exhaust of the treatment gases, such openings being indicated at 20. The supply or inlet and the discharge or exhaust openings are respectively marked with plus and minus symbols - "+" or "−". It will be noted that in the first pair of boxes A, the supply opening 20 is arranged in the lower box 18 toward the upstream end of the box, with respect to the direction of feed of the product through the oven; and the exhaust opening is arranged in the upper box 19 of this pair, near the downstream end.

The same general pattern is repeated in the boxes of the second pair indicated at B. In the third pair of boxes, indicated at C, the inlet opening is in the upper box 19 at the upstream end and the exhaust opening is in the lower box of the pair toward the downstream end.

In the zone indicated at D for the fourth pair of boxes, the pattern of inlet and outlet openings is the same as for pairs A and B. In the pair of boxes E, the arrangement of inlet and outlet conforms with that mentioned above in connection with zone C; and in the pair F, the arrangement shown conforms with that of the boxes D. It is to be understood that these relationships may be altered in order to vary the manner in which the curing is effected; and different flow conditions may be employed in connection with products of different types, thickness and/or densities, as is known in this art. In addition, a smaller or a larger number of circulation boxes and treatment zones may be utilized, according to the nature of the product being made. Still further, the flow through certain boxes may be shut off if desired.

Before considering the structure and operation of the high pressure air circulation system contemplated by the present invention, attention is called to the fact that the overall enclosure of the oven 6 is provided with a gas exhaust system including the ducts 21, and the exhaust fan 22, the latter delivering gases removed from the interior of the oven into and through an appropriate precipitator 23 for separation of suspended solids. The walls of the oven 6, in effect, comprise a hood surrounding the interior components of the oven including the heated gas circulation boxes described above, and the manifolds which are described hereinafter; and the leakage which occurs is withdrawn from the oven enclosure by the exhaust system just described.

FIG. 2 illustrates on an enlarged scale a transverse section through the low pressure boxes of zone C. Here it will be seen that the gas supply line 24 is connected with the upper or supply box 19 and that the exhaust duct 25 is connected with the lower exhaust circulation box 18. Vanes 19a serve to distribute the incoming gas over the width of the conveyor and thus over the width of the mat being treated. The gases discharged through the connection 25 are delivered to a heater 26 with which a burner 27 is associated, and these gases are drawn through the heater by the fan 28 and delivered by the fan into the supply duct 24. This gas heating and circulation system may be employed for more than one of the pairs of low pressure boxes, or if desired, separate circulation systems may be used.

To accommodate vertical motion of the upper conveyor and the parts mounted therewith, the supply duct 24 extends through an oversized opening 29 in the wall of the oven, and a flexible closure bellows 30 may be used to substantially seal the joint between the supply duct and the wall of the oven. In addition, the duct 24 is provided with a slip joint 24a to accommodate the vertical adjustment.

In considering the high pressure gas circulation system, attention is first directed to certain features of construction of the conveyors. As above noted, these conveyors are made up of links 11 which are pivotted to each other in an endless loop, one such loop being provided for each conveyor. The individual links (see for example FIGS. 2 and 3) extend across the width of the conveyor and have rollers 12 associated therewith at each edge of the conveyor, as appears from FIG. 2. Each link has a base plate 31 which is apertured at intervals across the width of the conveyor (as clearly appears in FIG. 2), and is provided with projecting ribs or flanges 32 forming transverse passages extended through the links for the flow of the gases from the low pressure supply boxes (described above) or high pressure supply manifolds (described herebelow), through the mat carried by the conveyors and then through the apertures and passages in the links of the other conveyor and into the exhaust boxes or manifolds.

As shown in the embodiment of FIGS. 1a and 1b, a high pressure manifold system HP1 is associated with the pair of low pressure boxes 18 and 19 in zone E, this high pressure system and the pair of low pressure boxes 18 and 19 being illustrated in enlarged longitudinal section in FIG. 3 and in enlarged transverse section in FIG. 4. From FIGS. 1b and 3, it will be seen that the high pressure manifold system is substantially smaller than the low pressure boxes 18 and 19 and further that the high pressure manifold system lies within the low pressure boxes 18 and 19. The high pressure supply manifold is indicated at 33; and from comparison of FIGS. 3 and 4, it will be noted that this manifold extends across the width of the conveyor, above the flight 10a, and of the mat being treated, but is of relatively short dimension in a direction upstream and downstream of the feed path of the mat. A supply duct 34 is connected with the high pressure supply manifold, this duct passing through an oversized opening 35 in the wall of the oven and the opening being closed by a flexible bellows seal 36. Duct 34 has a slip joint 34a to accommodate vertical motion. In the interior of the high pressure supply manifold, vanes 37 are provided to insure distribution of the high pressure gases over the width of the conveyor. A high pressure exhaust manifold 38 is provided below the flight 8a of the lower conveyor and the exhaust manifold is connected with the duct 39 in order to discharge the high pressure gases after they have passed through the mat being treated. The duct 39 delivers the withdrawn gases to a heater 40 having a burner 41 from which the gases are withdrawn by the fan 42 which recirculates the gases to the supply duct 34.

As in the low pressure system, the high pressure duct and circulation system, including the heater 40 and the fan 42, may be employed for more than one high pressure system; or if desired, separate heaters and fans may be utilized for different high pressure systems.

Although distributing vanes 37 are provided in the supply manifold 33, these are not needed in and are preferably omitted from the exhaust manifold 38.

FIG. 5 schematically illustrates an alternative form of heater which may be employed for heating the high pressure gases in the circulation system. Here, a heat exchanger diagrammatically indicated at 43, is introduced into the exhaust manifold 39 in advance of passage of the gases through the fan or blower 42. FIG. 5 also indicates an alternative arrangement of the high pressure supply and exhaust manifolds 33 and 38; in this illustration, the supply manifold 33 being located below the mat being treated and the exhaust manifold 38 being located above the mat.

Because of the employment of relatively high pressure gases in the high pressure system, it is of importance to minimize gas leakage, and this requires provision of special sealing devices, an example of such devices being particularly illustrated in FIG. 3. Here it will be seen that at each side of the upper or supply manifold 33, a supporting structure 44 is provided, this structure serving to mount a pair of wall elements 45, one located at each side of the manifold 33. Each of these wall elements is pivotally mounted as indicated at 46, so that the wall element may be swung or displaced upwardly away from the upper surface of the conveyor flight 10a. At a point opposite to the pivot 46, the wall element 45 is provided with a flange cooperating with a stop or abutment 47 which serves to limit downward movement of the wall element and thus prevents contact of the wall element with the upper surface of the conveyor flight 10a. Each of these wall elements 45 is of trough-like configuration, being extended across the entire width of the conveyor; and it is contemplated that these elements have a flat lower surface and that they be mounted in close proximity to the upper surface of the conveyor flight 10a, thereby providing sealing action preventing any substantial lateral flow or leakage of the high pressure gas being used in the high pressure manifold system. In a typical installation, in the normal operating position of each wall element 45, the element will be spaced from the upper surface of the flight 10a a distance of the order of a few millimeters, for instance, from about 3 to 5 mm.

These displaceable sealing wall elements are provided so that the sealing elements may be normally positioned much closer to the conveyor than would be possible if they were fixed in position. Displacement away from the conveyor will readily occur in the event of the accumulation on the conveyor of irregular deposits of resin or fibers, as tends to occur from time to time in the operation of such equipment. Since the elements 45 are automatically displaceable, if a lump or deposit is encountered, no damage to the equipment will occur, even when the wall elements are mounted for normal operation very close to the surface of the conveyor.

The elements 45, located above the conveyor, function automatically under the action of gravity to return to the position in close proximity to the conveyor, after being displaced by any deposit of resin or fibrous material. The width of the flat bottom surface of each of the trough-shaped elements 45 is preferably at least as great as any two adjacent passages between ribs 32 of the conveyor links 11, so that the desired sealing function will be performed, regardless of the relative position of the ribs 32 with respect to the wall elements 45 in a direction along the path of movement in the conveyor.

Similar displaceable wall elements 48 are associated with the flight 8a of the lower conveyor, these wall elements being arranged for downward displacement away from the lower surface of the conveyor flight 8a and being urged upwardly by springs 49. Similar pivots and limiting stops are provided for the lower elements 48, but the lower elements being displaceable downwardly under the action of obstructions encountered as the conveyor flight passes the high pressure system, springs instead of gravity are relied upon to return the wall elements 48 to their normal operating position.

Each of the wall elements 45,45 and 48,48 is provided with an inclined surface, such as indicated at 50, at the upstream side of the element, in order to facilitate the displacement action under the influence of foreign bodies carried by the conveyors.

From FIGS. 1b, 3 and 4, it will be noted that in the high pressure manifold system HP1, the supply manifold 33 is located above the conveyor and in the upper circulation box 19 of the low pressure zone E with which the low pressure gas supply connection communicates, the discharge manifold of this high pressure system HP1 being located in the discharge box 18 below the conveyor in the low pressure zone E.

By reference to FIG. 1b, it will also be seen that in the low pressure zone F, the high pressure system HP2 is inverted with relation to the arrangement shown in zone E. Thus, in FIG. 1b, the high pressure supply manifold 33 is located below the mat in the low pressure supply box 18 of zone F and the high pressure exhaust manifold 38 is located above the mat in the low pressure exhaust box 19 of zone F.

In the alternative arrangement of FIG. 1c, two high pressure circulation systems are shown as mounted within a single pair of low pressure boxes 18 and 19. Thus, in this alternative embodiment, the high pressure supply manifolds 33a and 33b are located in the low pressure box 19 above the mat in side-by-side relation with an intervening displaceable sealing wall element such as the sealing elements described above in connection with FIG. 3; and the cooperating high pressure exhaust manifolds 38a and 38b are mounted within the low pressure exhaust box 18 below the mat, with a displaceable wall element lying between the two high pressure exhaust manifolds of the type described above in connection with FIG. 3. Outboard displaceable wall elements are also associated with the high pressure manifold systems of FIG. 1c in the manner which will now be understood.

Although the high pressure air circulation systems contemplated according to the present invention may be employed in association with any of the treatment zones, A to F, it is particularly advantageous to employ such high pressure circulation systems in association with the low pressure circulation boxes downstream of about the mid region of the feed path and preferably at least ⅔ of the length of the feed path from the entrance end of the oven. Thus, in accordance with one preferred embodiment appearing in FIGS. 1a and 1b, two high pressure circulation systems are indicated in general at HP1 and HP2, these being located respectively within the low pressure zones E and F, being the last two in the embodiment of FIGS. 1a and 1b.

Where two high pressure systems are incorporated in a single pair of low pressure boxes, it is preferred to arrange the two high pressure supply manifolds at the same side of the mat, and preferably within the low pressure supply box, because this will minimize leakage problems, with consequent loss of heat.

Operating Conditions

As will be understood, the operating conditions will vary in accordance with a number of factors, including the thickness and density of the mat being formed, the composition and characteristics of the binder being used, and also the amount of binder employed. However, some general guidelines, with regard to the operating conditions, are presented herebelow.

First, it is contemplated that the low pressure circulation established by the circulation boxes 18 and 19, in the zones A to F inclusive, should include some zones in which the gases pass upwardly through the mat, and some zones in which the gases pass downwardly through the mat. Also, it is contemplated that the gases circulated through the boxes 18 and 19 in different zones may be at different temperatures, depending upon the characteristics of the mat and the binder used, as is already known in the operation of mat curing ovens having multiple zones of treatment. An appropriate temperature range for the gas supplied to circulation boxes 18 and 19 is from about 150° C. to about 300° C., when employing common types of fiber binders, such as phenol formaldehyde binders.

The pressure conditions established may also vary, and these pressure conditions may be measured in various ways. The pressure in the supply box and the pressure in the exhaust box will, of course, vary because of the drop in pressure incident to passage of the gas through the mat. In typical operating conditions, the pressure in the supply box of the low pressure systems may be of the order of from about 5 to 30 mm of water.

With regard to the high pressure circulation systems, it is contemplated that where more than one such system is utilized, for instance, in the configuration illustrated in FIG. 1b where one high pressure system HP1 is located in low pressure zone E and another high pressure system HP2 is located in low pressure zone F, it is contemplated that one of these high pressure systems should be arranged to pass the treatment gas through the mat in one direction and the other high pressure system be arranged to pass the gas through the mat in the opposite direction. Thus, as indicated by the arrow in FIG. 1b, the high pressure system HP1 is shown as delivering the gas downwardly and the high pressure system HP2 is shown by the arrow as delivering the gas upwardly. This will serve to maintain substantial uniformity of the treatment throughout the thickness of the mat.

With regard to the pressure and temperature employed in the high pressure systems, it is further pointed out that some benefit may be achieved by the employment of both low pressure and high pressure systems in combination in the same curing oven, even if the temperature of the high pressure system is not higher than or even lower than the temperature in the low pressure system. The reason for this is because the high pressure will cause more rapid and effective penetration of the heat to the interior of the mat than is the case with the low pressure system.

The high pressure system may be operated over a substantial range; but in general, should be at least several times, preferably at least 10 to 20 times, the pressure of the low pressure system. For example, the pressure in the supply manifolds of the high pressure systems may be upwards of about 300 to 600 mm of water.

In a typical case where the temperature of the air in the low pressure systems is from about 150° C. to about 300° C., the temperature in the high pressure systems may desirably be from about 200° C. to about 350° C.

In a typical installation, the high pressure systems may have a discharge flow of about 5,000 Nm³/h, when the discharge flow of the low pressure circulation system is about 30,000 Nm³/h. The high pressure gases are concentrated in the localized relatively small areas as compared with the low pressure gases, and those localized areas in a typical case may comprise about 10% of the area of the treatment zones established by the low pressure boxes.

The temperatures and pressures will also vary depending upon the speed of advancement of the mat being formed and on the number of treatment zones in the mat curing oven. The use, according to the invention, of both high and low pressure air circulation systems, is particularly effective from several standpoints, including the fact that for given binder curing effect, this may be accomplished in fewer treatment zones and with a substantially shorter overall length of the curing oven. This is due to the fact that the high pressure systems are particularly effective in bringing the interior portions of the mat up to curing temperature in a short time. It is also advantageous that the high pressure systems will rapidly bring the temperature of the binder to the level where exothermic reaction will occur even in the core portion of the mat; and this temperature will then be maintained more readily, even beyond the localized area of the high temperature manifolds.

We claim:

1. A method for heat treating a moving fibrous mat carrying a heat hardenable fiber binder in order to effect hardening of the binder and binding of the fibers to produce a mat having substantially uniform binding throughout the thickness thereof, comprising:
    (a) feeding the fibrous mat in a feed path through a heat treating zone of an oven having an entrance and an exit and in which the mat is heated to a temperature having a hardening effect on said binder, and
    (b) passing a heated gas through the mat in a localized area smaller than said zone of the oven and extended across the mat in said zone, said heated gas being at a temperature and pressure providing for heating of the interior portion of the mat in said localized area to a temperature higher than the temperature established by the heating of the mat in said heat treating zone of the oven in a region adjoining and upstream of said localized area, thereby effecting hardening of the binder in the interior portion of the mat.

2. The method of claim 1 wherein the heating of the mat in said adjoining region referred to step (b) is effected by passing heating gas through the mat at a pressure lower than that of the gas passed through the mat in said localized area.

3. The method of claim 2 wherein the temperature of the heated gas passed through the localized area referred to in step (b) is from about 150° C. to about 350° C. and in which the temperature of the heated gas passed through said adjoining region is from about 150° C. to about 300° C.

4. The method of claim 2 or claim 3 wherein the pressure of the heated gas in said localized area is at least several times that of the heated gas passed through said adjoining region.

5. The method of claim 2 or claim 3 wherein the pressure of the heated gas in said localized area is at least 10 to 20 times that of the heated gas passed through said adjoining region.

6. The method of claim 2 or claim 3 wherein the pressure of the heated gas passed through the mat in said adjoining region is from 5 to 30 mm of water.

7. The method of claim 1 wherein said localized area referred to in step (b) is located in the feed path of the mat through the heat treating zone downstream of at least the mid point between said entrance and exit of the treating zone in the oven.

8. A method for heat treating a moving fibrous mat carrying a heat hardenable fiber binder in order to effect hardening of the binder and binding of the fibers to produce a mat having substantially uniform binding throughout the thickness thereof, comprising:
    (a) feeding the fibrous mat through a heat treating zone of an oven having an entrance and an exit and in which a first heated gas is passed through the mat from one side face to the opposite side face of the mat, and
    (b) passing a second heated gas through a localized area of the mat lying within said zone, which area is smaller than the total area of said zone,
    (c) the temperatures of both of said heated gases being sufficiently high to have a hardening effect on said binder, and the pressure of said second heated gas being higher than the pressure of said first heated gas to provide for increased hardening effect on said binder in said localized area.

\* \* \* \* \*